June 27, 1944. T. GOMPERZ 2,352,429
TOOL FOR UPSETTING DIE HEADS
Filed Nov. 29, 1940
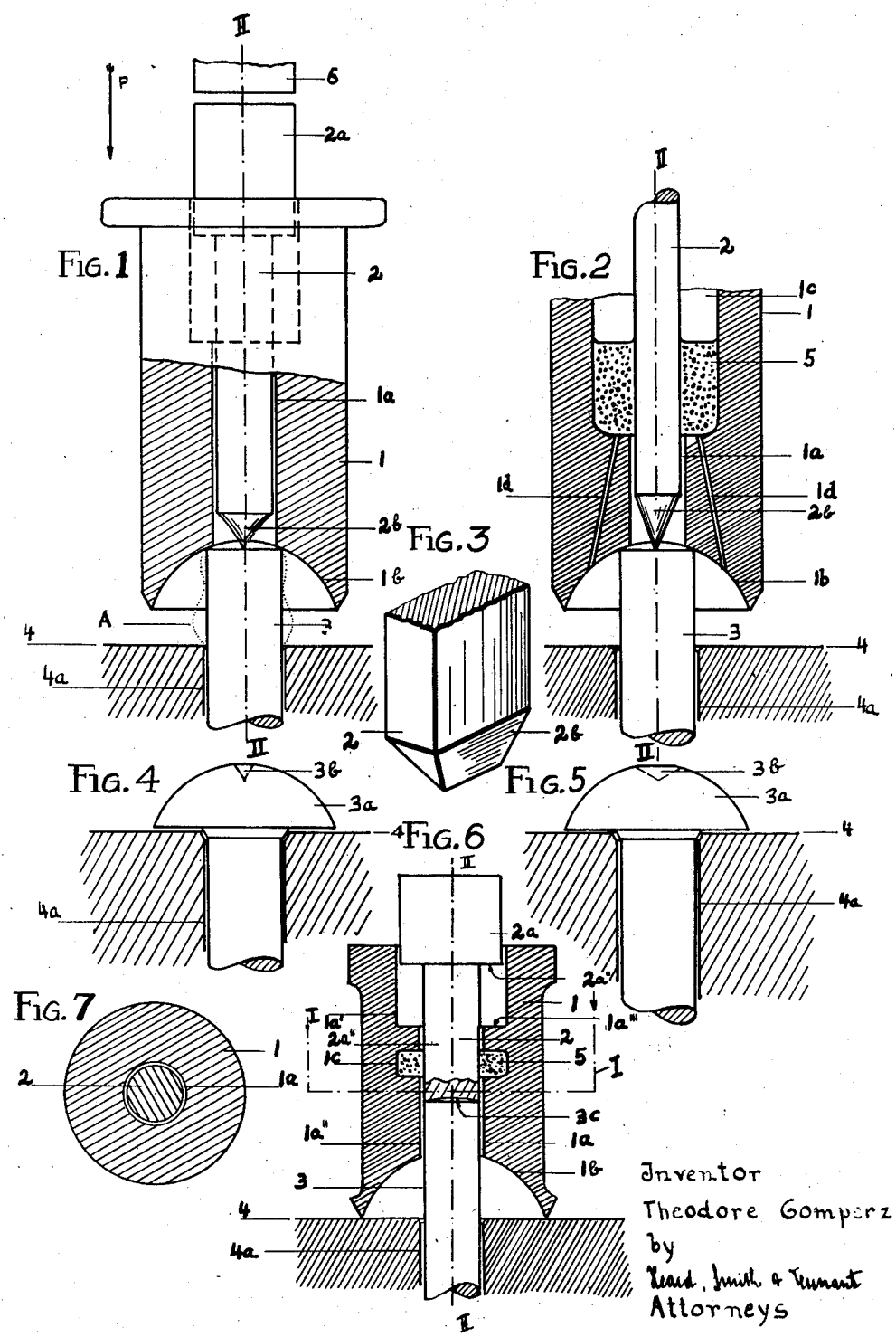
Inventor
Theodore Gomperz
by
Heard, Smith & Tennant
Attorneys Patented June 27, 1944

2,352,429

UNITED STATES PATENT OFFICE 2,352,429

TOOL FOR UPSETTING DIE HEADS

Theodore Gomperz, Budapest, Hungary

Application November 29, 1940, Serial No. 367,733
In Hungary November 29, 1939

4 Claims. (Cl. 78—46)

The invention concerns the upsetting of shanks and more particularly heading tools or head dies for upsetting rivet, screw and the like heads. From a more limited aspect, the present invention relates to a heading tool comprising two parts, an outer part and an inner or central part which parts are movable, or slidable with respect to one another and wherein the outer part may be securely centered with respect to the shank which is intended to be subjected to the upsetting operation.

One object of the invention is to improve the known heading tools or head dies of the type referred to above.

Another object of the invention is to provide a tool which enables a preliminary upsetting of a shank or the like to be effected and to subsequently complete the upsetting operation thereby die heading the shank, and to keep both the shank and the outer and inner tool member in proper alignment during the entire die heading operation.

Still other objects of the invention are to bring about, during the preliminary upsetting of the shank, a stronger lateral displacement of the material of which the shank is made than that which is effected in prior art devices, and to provide an outer die member having a free pressure receiving top surface adapted to be positively acted upon by an additional or separate pressure exerting tool such as, for instance, a pneumatic hammer.

Other objects will be explained hereinafter and will be particularly pointed out in the appended claims.

With these ends in view, a feature of the invention resides in adapting the inner die member to be actuated independently of the outer die member so as to enable a centering and a preliminary upsetting of the shank to be effected by actuating the inner die member while the outer die member is not acted upon. When this centering and preliminary upsetting operation is completed, one end of the inner die member, or force- or blow-transmitting member, engages an end face of the shank which is intended to be die headed and thereby centers the outer die member, or tool body, with respect to said shank. Now the upsetting operation may safely be completed by actuating the outer die member thereby die heading the shank. According to a preferred embodiment of the invention, the outer die member, or tool body, has a bore or the like aperture which is adapted to be placed on and to register with the shank which is intended to be headed, whereby, the tool body is directly centered by said shank and in turn forms a guide for the shank.

The tool according to the present invention may be used either in connection with a pneumatic hammer or like a power percussion tool or in connection with other actuating means such as, for instance, a riveting press. It may be applied whether the upsetting is done by hand or by any machine.

The invention will be explained in greater detail in connection with the accompanying drawing, in which Figs. 1 and 2 are diagrammatic front views, and partially vertical sections of a heading tool constructed according to the present invention. Fig. 3 is a perspective view of a modification of the tip of the inner tool member. Figs. 4 and 5 are side elevations of rivet heads which are made with a tool according to the present invention. Fig. 6 illustrates partially in side view and partially in vertical section a preferred embodiment of the present invention, and Fig. 7 is a horizontal section along the line I—I of Fig. 6.

The head die according to Fig. 1 comprises an outer head die member, or simply die member, or tool body 1 having a central bore 1a piercing the head shaping surface 1b at its center portion. The additional inner die member or force-transmitting member 2 is slidably arranged within the bore 1a of the member 1 and adapted to be actuated independently of the outer die member 1, i. e. it may be moved or shifted in a downward direction by means of a blow of a hammer 6 or other external power source on its head 2a in the direction of the arrow P without thereby affecting the outer member 1. It will be noted that the additional member 2 is arranged along the center line II—II of the outer member 2, i. e. in the axis of its head-shaping surface or depression 1b. The lower end of the inner or force-transmitting member 2 rests on the shank 3 which is intended to be die headed. The lower end of the force-transmitting member 2 is provided with means adapted to engage said shank 3 e. g. a centering point 2b. The additional inner member 2 is arranged along the center line of the shank 3 and by its engagement with the shank 3 centers the outer die member 1 with respect to said shank 3. At the beginning of the die heading process some hammer blows will be directed against the head 2a of the force-transmitting member 2 whereby the centering point 2b comes into better engagement with the shank 3 and a preliminary upsetting of the shank 3 is effected. The outline of the shank 3 after this preliminary upsetting is indicated by a dotted line A. The largest diameter of the upset portion of the shank 3 is situated immediately above the surface of the metal sheet 4. After this preliminary work has been done the outer member 1 is driven in a downway direction whereby the upsetting operation is completed and the shank is die headed. In this second phase both the outer and inner die members 1 and 2 may be subjected to the action of a pneumatic hammer or other actuating means.

The outline of the point 2b of the force-transmitting member 2 is concave in order to reduce the trace of the point in the rivet head 3a to a minimum as shown in Fig. 4, wherefrom it appears that the rivet head 3a has received but an insignificant trace 3b from the centering point 2b.

A different result is obtained when using an inner die member 2 having a conical point 2b as illustrated in Fig. 2. Such a point will result in deeper mark 3b left by the point 2b as clearly shown in Fig. 5. However, this may be considered as of a certain advantage as the conical point 2b displaces the material of which the shank is made from the center of the head in a radial direction towards its periphery where it is mostly needed.

The embodiment of the invention shown in Fig. 2 is similar to that shown in Fig. 1 but the former is provided with an additional lubricating feature. According to Fig. 2 the outer die member 1 is provided with a chamber or cavity 1c for accommodating a lubricant 5. If desired, the cavity or head shaping surface 1b of the outer die member 1 may be connected by bores 1d or the like to the lubricating chamber 1c in order to lubricate the shank 3. This feature is of special importance in the process of cold riveting.

The point 2b of the force-transmitting member 2 illustrated in Fig. 3 has the shape of a wedge and is particularly suited for upsetting square bolt heads.

According to Fig. 6 the outer die member or tool body 1 has a cavity or head-shaping surface 1b and a bore 1a pierces said head-shaping surface 1b at its apex. The bore 1a of the tool body 1 is adapted to be placed upon the shank 3 which is inserted in the bore 4a of the metal sheet 4 whereby the tool body 1 is centered by the shank 3. The force-transmitting member 2 is slidably arranged in the bore 1a of the tool body 1. The lower end of the force-transmitting member 2 is slightly concave so as to engage the top 3c of the shank. The upper or opposite end of the force-transmitting member 2 protrudes from the tool body 1 and is adapted to be acted upon by an actuating means, e. g. receive blows from a pneumatic hammer or being pressed down by the pressure exerted by a riveting press in order to transmit the power of such device onto the shank 3. The bore 1a in the tool body 1 comprises two portions 1a' and 1a'' of different width. The portion 1a'' situated adjacent to the head-shaping surface 1b is of smaller width than the portion 1a' situated at the opposite end of the tool body 1. A shoulder 1a''' is formed between the portions 1a' and 1a'' of the bore 1a. The force-transmitting member 2 has two portions 2a and 2a' of different width which correspond to the portions 1a' and 1a'' of different width of the bore 1a. A shoulder portion 2a'' is formed between the portions 2a and 2a' of the force-transmitting member 2. The shoulder portion 1a''' of the bore 1a and the shoulder portion 2a'' of the inner die member or force-transmitting member 2 serve as cooperating abutments which limit the stroke of the force-transmitting member 2 with respect to the tool body 1. Upon abutting on one another, the shoulders 1a''' and 2a''' cause the members 1 and 2 to be shifted as a unit in a downward direction when an external force continues to be exerted upon the head 2a of the member 2. The free end of the inner die member 2 protrudes from the top surface of the outer die member 1 in the initial position of the inner die member 2 when the latter rests on the shank 3 and is flush with the top surface of the outer die member 1 after the inner die member 2 has been moved for a predetermined distance within the bore 1a of the outer die member 1. When the parts 1 and 2 assume that relative position, the blows of a hammer will hit both die members and, therefore, a portion of the total force which is required for die heading the shank 3 will be directly received by the outer die member 1 and transmitted to the shank. In other words, the inner die member 2 needs not to transmit upon the shank 3 the entire force which is exerted by the head die actuating device and, therefore, the inner die member 2 may be of relatively light design and its inertia may be relatively small. This is very desirable as regards the preliminary upsetting of the shank to which reference has been made above.

The embodiment of the invention shown in Fig. 6 is provided with a grease chamber 1c which is filled with an appropriate lubricant 5 for lubricating the working surfaces of the outer die member 1 which bear the inner die member 2.

When the shank 3 is being inserted into the bore 1a of the tool body 1 both the tool body 1 and the inner member 2 become properly centered with respect to the shank 3. Of course, the internal diameter of the bore 1a must be substantially equal to the outer diameter of the shank 3. When an external force is applied on the head 2a of the inner die member 2 the shank 3 is driven out of the bore 1a of the outer die member 1. As indicated above the increase of the diameter of the shank 3 begins near to the surface of the metal sheet 4, and in consequence thereof there is no danger that the upper portion of the shank 3 will become jammed in the bore 1a. The member 2 depresses the shank 3 without any special difficulty, and the engaging surfaces of the member 2 and the shank 3, respectively, provide a centering means in addition to the centering of the outer member 1 by its engaging the shank 3. The outer edge of the surface of the inner member 2 which rests upon the top surface of the shank 3 need not necessarily have the shape of a circle. The lower, slightly concave end of the member 2, instead of having smooth surface, may be provided with radially-extending ribs, or ridges, or corrugations, and in this case the outer circumference of the surface abutting against the top 3a of the shank 3 will be shaped more or less like the teeth of a saw. The inner die member 2 of the device shown in Fig. 6, of course, may be provided with a pointed projection such as shown in Figs. 1 and 2 which is adapted to intrude, during the preliminary upsetting operation of the shank, into the material of which the shank is made, thereby causing a substantial displacement of said material in transversal direction.

In connection with the standard rivet sets and other prior-art heading tools whether fitted with a central centering bolt or not there always existed the danger of improperly applying the tool. Thereby the shank might be bent and that portion of the shank which is intended to be headed might be shifted out of alignment with the bore in which the shank is accommodated. Frequently, the material of which the shank is made is displaced irregularly, i. e. one side of the rivet head has material in excess, while there is a deficiency of material on the other side of the rivet head. On the side where there is an excess of material the same is displaced beyond the circumference of the head-shaping cavity in the heading tool, and this causes the formation of a burr, while the deficiency on the other side of said cavity prevents the cavity from being completely filled with material. Generally the shanks of rivets or the like are cut in over-length in order to be certain to entirely fill the cavity of the head die rather than to obtain incomplete die heads. Of course, by the use of shanks which are cut in over-length a burr is formed all around the rivet head, but this drawback evidently had to be accepted in order to prevent the formation of incomplete die heads.

It may readily be seen that rivet or like heads which are made by means of the tool according to the present invention are free from the disadvantages which were stated above. Because of the fact that the head die is actually properly centered with respect to the center line of the shank which is intended to be headed, the upsetting process is entirely under control. Therefore it is not necessary to provide excess material in order to obtain complete die heads, and the formation of burrs will not occur and, therefore, the process of eliminating burrs is dispensed with. In addition thereto, the strength of the rivet or like connection is increased because of the elimination of undesirable distortions.

It is apparent from the foregoing that the central die member or plunger 2 may have a comparatively small mass. Therefore, it will transmit to a shank 3 the blows of a hammer without an appreciable damping, and an effective upsetting of the shank is obtained at the first hammer strokes.

The term die which has been used throughout the specification is intended to be understood in a broad sense and to cover all kinds of tools which are adapted for the upsetting of heads on smooth or screw threaded shanks or bolts. The tool containing the cavity in which the upsetting is done may be worked from the top or the bottom.

While the drawing illustrates several embodiments of the invention wherein the outer die member 1 is provided with a concave, substantially hemispherical head-shaping surface 1b, it is apparent that the invention is not limited to heading tools, or head dies, having an outer die member the head-shaping surface of which is concave and substantially hemispherical. The head-shaping surface of the outer die member may be adapted to the specific requirements of any particular case.

While the feature of providing some sort of shoulder in the bore of the outer die member and of shaping the inner die member so as to conform to the stepped shape of the bore is in itself an important one, it is by no means necessary to provide for a rectangular shoulder as shown in Figs. 1 and 6. The shoulder may have any other desired shape which will operate, in substance, in the same way as the shoulder portions which are shown in the drawing. However, it will be necessary, in order to obtain the desired results, to design the bore and the force-transmitting member in such a way that each of them comprises two portions of diffrent average width.

It will be understood that the invention is in no other way restricted to the exact embodiments thereof that are illustrated and described herein, as modifications may be made by persons skilled in the art, and all such are considered to fall within the spirit and scope of the invention, as defined in the appended claims.

What is claimed is:

1. In a head die in combination, an outer die member and an inner die member, the outer die member having a top surface, a bore piercing said top surface, said bore comprising two portions of different width, the portion of the bore situated adjacent to the top surface of the outer die member being of wider width than the portion situated at the opposite side of the outer die member, the inner die member being slidably arranged within the bore of the outer die member and having two portions of different width corresponding to the two portions of the bore, one end of the inner die member being adapted to receive blows from a hammer, said end protruding from the top surface of the outer die member in the initial position of the inner die member when the latter rests on a shank and being flush with the top surface of the outer die member upon having been moved a predetermined distance within the bore of the outer die member.

2. In a head die in combination, an outer die member and an inner force-transmitting member, the outer die member having a top surface, a bore piercing the top surface, the inner force-transmitting member being slidably arranged within the bore of the outer die member, one end of the force-transmitting member being adapted to be acted upon by a head die actuating device, said end protruding from the top surface of the outer die member in the initial position of the force-transmitting member when the latter is resting on a shank and being flush with the top surface of the outer die member when the force-transmitting member has been moved for a predetermined distance within the bore of the outer die member, the opposite end of the force-transmitting member having a projection adapted to intrude into the shank thereby tending to displace the material from which the shank is made in a radial direction.

3. In a head die in combination, a radially outer die member and a radially inner die member, the radially outer die member having a pressure receiving top surface adapted to be positively acted upon by a separate head die actuating device and a spherical head-shaping surface opposite to said top surface, a bore piercing said top surface, said bore comprising two portions of different average width, the portion of the bore situated adjacent to the top surface of the outer die member having a relatively wider average width than the portion situated at the opposite side of the outer die member, the inner die member having two portions of substantially the same size and width as the bore in the outer die member and being slidably arranged within said bore, one end of the inner die member being adapted to be positively acted upon by a separate head die actuating device, said end protruding from the top surface of the outer die member in the initial position of the inner die member when the latter rests on a shank and being flush with the top surface of the outer die member upon having been moved a predetermined distance within the bore of the outer die member.

4. In a head die in combination, an outer die member and an inner force-transmitting member, the outer die member having a pressure receiving top surface adapted to be positively acted upon by a separate head die actuating device and a spherical head-shaping surface opposite said top surface, a bore piercing said top surface, the force-transmitting member being slidably arranged within the bore of the outer die member, one end of the force-transmitting member being adapted to be positively acted upon by a head die actuating device, said end protruding from the top surface of the outer die member in the initial position of the force-transmitting member when the latter rests on a shank and being flush with the top surface of the outer die member when the force-transmitting member has been moved for a predetermined distance within the bore of the outer die member, the opposite end of the force-transmitting member having a pointed end adapted to intrude into the shank, thereby tending to displace the material of which the shank is made in a radial direction.

THEODORE GOMPERZ.